(12) United States Patent
Tritschler et al.

(10) Patent No.: US 12,188,491 B2
(45) Date of Patent: Jan. 7, 2025

(54) FAIL-SAFE DRIVE AND ACTUATING DRIVE WITH A FAIL-SAFE DRIVE

(71) Applicant: AUMA Riester GmbH & Co. KG, Müllheim (DE)

(72) Inventors: Matthias Tritschler, Hartheim (DE); Peter Malus, Müllheim (DE); Lutz Stöcklin, Weisweil (DE); Guido Koch, Karlsruhe (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 71 days.

(21) Appl. No.: 17/924,020

(22) PCT Filed: May 6, 2021

(86) PCT No.: PCT/EP2021/062053
§ 371 (c)(1),
(2) Date: Nov. 8, 2022

(87) PCT Pub. No.: WO2021/224415
PCT Pub. Date: Nov. 11, 2021

(65) Prior Publication Data
US 2023/0184317 A1   Jun. 15, 2023

(30) Foreign Application Priority Data
May 8, 2020 (DE) .......................... 102020112548.8

(51) Int. Cl.
*F15B 1/04* (2006.01)
*F15B 1/027* (2006.01)
(Continued)

(52) U.S. Cl.
CPC ................ *F15B 1/04* (2013.01); *F15B 1/027* (2013.01); *F15B 15/00* (2013.01); *F16H 25/18* (2013.01);
(Continued)

(58) Field of Classification Search
CPC .. F15B 1/04; F15B 1/027; F15B 15/00; F16H 25/18; F16H 57/00; F16H 37/122;
(Continued)

(56) References Cited

U.S. PATENT DOCUMENTS 3,416,566 A * 12/1968 Anderson ........... E21B 33/0355
74/625
3,422,328 A * 1/1969 Anderson ............... E21B 34/04
137/635

(Continued)

FOREIGN PATENT DOCUMENTS

AT        411704      4/2004
DE        3840125     5/1990
(Continued)

*Primary Examiner* — Daphne M Barry
(74) *Attorney, Agent, or Firm* — Volpe Koenig

(57) ABSTRACT

A fail-safe drive (1) for an actuating drive is provided, which has a cam disc (8), at least one restoring element, a counter-element (5) and an output shaft (3), with the cam disc (8) and the counter-element (5) being configured for joint conversion of an axial movement of the restoring element along the output shaft (3) into a rotational movement of the output shaft (3). The cam disc (8) has a control cam (10), the profile of which is adapted to a spring characteristic curve of the restoring element such that, in the case of activation of the failsafe drive (1), a constant output movement and/or a constant output torque can be generated.

22 Claims, 8 Drawing Sheets

(51) Int. Cl.
*F15B 15/00* (2006.01)
*F16H 25/18* (2006.01)
*F16H 37/12* (2006.01)
*F16H 57/00* (2012.01)
*F16K 31/04* (2006.01)
*F16K 31/05* (2006.01)
*F16K 37/00* (2006.01)

(52) U.S. Cl.
CPC ........... *F16H 57/00* (2013.01); *F16K 31/047* (2013.01); *F16K 37/0008* (2013.01); *F16H 37/122* (2013.01); *F16H 57/0006* (2013.01); *F16H 2057/0081* (2013.01); *F16K 31/05* (2013.01)

(58) Field of Classification Search
CPC ........... F16H 57/006; F16H 2057/0081; F16K 31/047; F16K 37/0008; F16K 31/05
See application file for complete search history.

(56) References Cited

U.S. PATENT DOCUMENTS

| | | | | |
|---|---|---|---|---|
| 3,512,421 | A * | 5/1970 | Anderson | F16K 31/05 251/71 |
| 3,518,891 | A * | 7/1970 | Denkowski | F16K 31/05 251/71 |
| 3,675,420 | A | 7/1972 | Adams | |
| 3,705,594 | A * | 12/1972 | Placek | F16K 31/02 137/1 |
| 4,089,398 | A * | 5/1978 | Stratienko | F16D 21/06 192/114 R |
| 4,090,589 | A * | 5/1978 | Fitzwater | F16D 13/025 92/143 |
| 4,111,070 | A * | 9/1978 | Stratienko | F16K 31/05 267/89 |
| 4,113,063 | A * | 9/1978 | Troy | F16K 31/055 74/625 |
| 4,248,104 | A | 2/1981 | Wood, III | |
| 4,492,346 | A * | 1/1985 | Young | B65H 75/242 242/576 |
| 5,195,721 | A * | 3/1993 | Akkerman | F16D 43/2024 192/81 C |
| 5,984,260 | A * | 11/1999 | Rawson | F16K 31/047 251/71 |
| 6,129,333 | A * | 10/2000 | Ma | F16K 31/56 251/71 |
| 6,231,027 | B1 | 5/2001 | Baker et al. | |
| 6,488,260 | B1 * | 12/2002 | Dietz | F16K 31/047 464/30 |
| 6,572,076 | B1 | 6/2003 | Appleford et al. | |
| 6,997,430 | B2 * | 2/2006 | Denning | F16K 31/047 251/71 |
| 9,114,798 | B1 | 8/2015 | Fox et al. | |
| 2003/0145667 | A1 | 8/2003 | Donald et al. | |
| 2007/0075285 | A1 | 4/2007 | Lovejoy | |
| 2011/0114860 | A1 * | 5/2011 | Schade | F16K 31/048 251/129.11 |
| 2012/0298894 | A1 * | 11/2012 | Fuehrer | F16K 31/53 251/227 |
| 2016/0273561 | A1 | 9/2016 | LeBlanc et al. | |

FOREIGN PATENT DOCUMENTS

| | | |
|---|---|---|
| DE | 102009022700 | 12/2010 |
| DE | 102010007137 | 8/2011 |
| DE | 102014010182 | 1/2016 |
| EP | 1035307 | 9/2000 |
| WO | 20190002632 | 1/2000 |
| WO | 0190621 | 11/2001 |
| WO | 2011037287 | 3/2011 |

* cited by examiner

FAIL-SAFE DRIVE AND ACTUATING DRIVE WITH A FAIL-SAFE DRIVE

TECHNICAL FIELD

The invention relates to failsafe drives and to an actuating drive with a failsafe drive.

BACKGROUND

U.S. Pat. No. 4,248,104 A has previously disclosed a cam-driven spring return mechanism in conjunction with an actuator for a control element, for example a valve.

U.S. Pat. No. 6,572,076 B1 has previously disclosed a valve actuator which comprises a housing, an actuating part which is situated partially in the housing and is movable in relation to the housing, drive means which are arranged to drive the actuating part between a first and a second position, in order to reconfigure a valve between a first and a second location, excitable, resilient means within the housing, locking means for locking the resilient means in an excitable state, the locking means making it possible for the drive means to drive the actuating part from both of its positions to another position, without the resilient means substantially being excited or deactivated when the resilient means are locked by the locking means, unlocking means to unlock the resilient means from the locking means in order to bring it about that the actuating part is moved to one of its positions under the influence of the deactivation of the resilient means and, as a result, to reconfigure the valve from one location to the other location, and load transmission means which are fastened displaceably within the housing and are prestressed in relation to the housing by way of the resilient means.

US2003/145667A1 has previously disclosed a linear actuator. The linear actuator comprises a motor for producing a rotational movement, a device for producing a linear movement which is coupled to the motor for converting the rotational movement into a linear movement and which has a threaded shaft and nut arrangement, a driven element which can be moved in a linear manner between a first position and a second position by way of the device for producing a linear movement and which is coupled to an element of the shaft and nut arrangement, and a restoring device for returning the driven element into the first position in the case of a malfunction.

WO 01/90621 A1 has previously disclosed a damping device for a safety drive of an actuating drive for a fitting or actuator or the like. The safety drive can be activated in the case of a malfunction, in the case of an energy failure, in order to adjust the actuator into a predefined safety position with damping by way of the damping device. The damping device has an energy converter and is characterized in that the energy converter has an electric generator which is connected to the safety drive in order to convert kinetic energy into electric energy, and an electric load which is connected to the generator.

Further failsafe drives of the type mentioned at the outset are previously known from documents U.S. Pat. No. 6,231,027 B1, WO 2011/037 287 A1 and EP 1 035 307 A1.

Failsafe drives can be used to adjust a fitting, for example a valve or a ballcock, or else a machine part into a defined position outside of regular operation if, for example, an energy supply of an actuating drive fails, by way of the drive motor of which actuating drive the fitting or the machine part is as a rule actuated.

Failsafe drives are often also called failsafe units and up to now have been arranged connected in parallel to the drive motors, used as a rule, of the actuating drives. Therefore, depending on the application, for example, the fitting of the machine part can selectively be actuated by way of the drive motor or the failsafe drive.

It has been shown here that these epicyclic gear mechanisms have an unfavourable degree of efficiency, in particular if they are to be used in reverse in order to tension a mechanical drive energy store of the failsafe drive. Therefore, the previous solutions frequently have an additional motor which is assigned to the failsafe drive.

SUMMARY

It is an object of the invention, in particular, to provide a failsafe drive and an actuating drive which have a simpler construction.

In order to achieve the object, first of all a failsafe drive with the features of the independent claim which is directed to a failsafe drive of this type is proposed. In particular, in order to achieve the object, the failsafe drive for an actuating drive is therefore proposed, which failsafe drive has a drive energy store which comprises at least one cup spring.

The cup spring of the drive energy store can be tensioned in a comparatively simple manner by way of a drive motor of an actuating drive which is equipped with the failsafe drive. Furthermore, it is possible as a result of the use of at least one cup spring in the drive energy store of the failsafe drive for the latter to be of comparatively compact overall design. The failsafe drive can thus also be integrated simply into a compact housing of an actuating drive.

According to one embodiment, it is provided according to the invention that the failsafe drive has a cam disc, in particular a restoring element, in particular a restoring spring, a counter-element and an output shaft, the cam disc and the counter-shaft being configured for the common conversion of an axial movement of the restoring element into a rotational movement of the output shaft. The axial movement can result, for example, from relieving of the restoring element.

For example, a restoring spring, in particular the above-mentioned at least one cup spring or a helical spring, can be provided as at least one restoring element of the failsafe drive.

It is provided in the case of one embodiment of the failsafe drive that it is possible for the counter-element to be rotated by way of an axial movement, caused by the restoring element, of the cam disc, and it is possible for the output shaft to be rotated by way of the rotational movement of the counter-element. In the case of this embodiment, the counter-element can be fixedly connected at least indirectly to the output shaft of the failsafe drive for conjoint rotation.

It is provided in the case of another embodiment of the failsafe drive that it is possible for the cam disc to be rotated by way of an axial movement, caused by the restoring element, of the counter-element, and it is possible for the output shaft to be rotated by way of the rotational movement, produced in this way, of the cam disc. In the case of this embodiment, the cam disc can be fixedly connected at least indirectly to the output shaft of the failsafe drive for conjoint rotation.

In the case of one embodiment of the failsafe drive, the cam disc can be capable of being displaced axially by way of at least one cup spring of the drive energy store. The cam disc can be assigned the counter-element of the failsafe drive, which counter-element can be connected or is connected at least indirectly to a driving shaft and, for example, furthermore to an output shaft of an actuating drive. The connection between the driving shaft and the counter-element can preferably be releasable, in order to permit a relative rotation of the counter-element with respect to the driving shaft. In order to release this connection, a locking apparatus, which will be described in greater detail further below, of the failsafe drive can be used. It is thus possible for the counter-element to be decoupled from the driving shaft as required and to be actuated with the aid of the failsafe drive if the output shaft is to be moved into a provided position if the drive motor of the actuating drive cannot be used, for example in the case of a power failure.

In the case of another embodiment of the failsafe drive, the counter-element can be displaced axially by way of an axial movement of the at least one cup spring. The counter-element is then assigned to the cam disc which, in the case of this exemplary embodiment, can then be connected or is connected at least indirectly to a driving shaft and, for example, furthermore to an output shaft of an actuating drive. The connection between the driving shaft and the cam disc can preferably be releasable, in order to permit a relative rotation of the cam disc with respect to the driving shaft. The locking apparatus, which is described in greater detail further below, of the failsafe drive can once again be used to release this connection.

According to the invention, the cam disc has at least one control cam, the course of which is adapted to a spring characteristic curve of the at least one restoring element, in particular of the at least one cup spring, in such a way that, in the case of activation of the failsafe drive, a constant output movement and/or a constant output torque can be produced.

It is provided in the case of one embodiment of the failsafe drive for at least one cup spring to be used which has a non-linear spring characteristic curve. In this case, the failsafe drive can have a cam disc, by way of which the non-linear spring characteristic curve of the at least one cup spring can be compensated for in such a way that the abovementioned constant output movement and/or the abovementioned constant output torque can be produced despite the non-linear spring characteristic curve of the at least one cup spring.

As a result of an interaction between the correspondingly configured cam disc and the at least one cup spring of the drive energy store of the failsafe drive, a constant output torque can be achieved which is transmitted by way of the failsafe drive to an actuator, for example a fitting and/or a valve.

In order for it to be possible for sufficient drive energy to be provided even in the case of a comparatively small installation space, it is advantageous if the drive energy store of the failsafe drive comprises at least two, preferably a plurality of, cup springs which are arranged in a stack, in particular with a non-linear spring characteristic curve. Here, the cup springs can be stacked in opposite directions, with the result that a sufficiently large stroke can be achieved by way of them, in order to adjust the axially displaceable cam disc in order to actuate the counter-element.

As a result of the use of at least two, preferably a plurality of, laminated cup springs, a comparatively high energy density can be provided in the drive energy store, which facilitates a compact overall design of the drive energy store and therefore of the entire failsafe drive. In this way, the failsafe drive can also be integrated comparatively simply into a compact housing of an actuating drive.

The cam disc can be configured as a globoid cam disc.

The cam disc can have at least two, in particular three or more, control cams which are preferably arranged distributed uniformly about a rotational axis of the cam disc. In this way, it is possible for the abovementioned counter-element of the failsafe drive to be loaded uniformly by way of the cam disc and for the axial movement of the cam disc which is caused by way of the at least one cup spring of the drive energy store to be transmitted uniformly to the counter-element, in particular to the output disc, of the actuating drive and to be converted into a rotational movement of the counter-element.

It is provided in the case of one embodiment of the failsafe drive that the counter-element, in particular the output disc, has at least one output roller. Here, this at least one output roller can roll on the cam disc, in order to carry out the abovementioned movement conversion. The counter-element preferably has a number of output rollers which corresponds to a number of control cams of the cam disc. Each control cam of the cam disc can thus be assigned in each case one output roller of the counter-element. Here, the plurality of drive rollers can be arranged distributed uniformly about a rotational axis of the counter-element. Furthermore, it is possible for the at least one output roller to be guided, in the use position, along a control cam, assigned to it, of the cam disc.

In order for it to be possible for the actuating position of the output shaft of the failsafe drive to be checked easily, the failsafe drive can have a position indicator for its output shaft. The position indicator can comprise a first rack which is, in particular, curved and can be connected to the output shaft of the failsafe drive, in particular indirectly, for example via the counter-element or the cam disc. By way of this first rack, a movement of the output shaft can be transmitted at least indirectly to an indicator element of the position indicator.

For the transmission of the movement of the output shaft to the indicator element, the position indicator can have a second rack which for its part is connected to the abovementioned indicator element. The movement of the first rack can be transmitted to the second rack and, from there, to the indicator element via a transmission shaft which can have a pinion for each rack. The indicator element can be moved by way of the movement of the indicator shaft into a viewing window of a housing, as a result of which the position of the output shaft can be read off from the outside.

It is provided in the case of one embodiment of the failsafe drive that the output shaft is coupled at least indirectly to a movement damper, for example via the counter-element or the cam disc. The movement damper can be part of the failsafe drive.

With the aid of the movement damper, it is possible to damp the actuating movement which is produced in an emergency by way of the failsafe drive, and thus to avoid damage to the failsafe drive, to the actuating drive which is equipped with a failsafe drive, and/or to the fitting which is to be actuated by way of the actuating drive, and/or to the machine part which is to be actuated by way of the actuating drive.

Furthermore, the movement damper can be coupled to the counter-element, in particular to the output disc, in order to damp the movement of the counter-element, which movement is caused at least indirectly by the drive energy store.

The movement damper can comprise a liquid chamber and at least one displacer element which can be moved therein, for example a displacer vane. The liquid chamber can be filled with oil, for example. The displacer element can be connected or can be capable of being connected at least indirectly to the output shaft, for example via the counter-element or the cam disc. If the counter-element or the cam disc is set in motion at least indirectly with the aid of the drive energy store of the failsafe drive, the movement of the counter-element or the cam disc is also transmitted to the displacer element. By virtue of the fact that the displacer element can be moved within the liquid chamber, the movement of the displacer element is damped, braked and/or retarded by way of the liquid, in particular the oil, which is contained within the liquid chamber, with the result that ultimately the movement of the counter-element connected to the displacer element or of the cam disc of the failsafe drive and therefore ultimately the movement of the output shaft can also be damped.

It is advantageous if it is possible for a degree of damping of the movement damper to be set. This can take place, for example, with the aid of at least one flow regulator of the movement damper.

The movement damper can provide different degrees of damping along an adjustment travel of the displacer element. It is thus possible that, just before the displacer element has reached its end position, the movement damper provides a higher degree of damping and therefore brings about a higher damping action on the counter-element of the failsafe drive, which counter-element is connected to it at least indirectly.

The different degrees of damping can be provided, for example, by different flow regulators of the movement damper.

A degree of damping in the region of an end position of the displacer element on its adjusting travel through the liquid chamber can be greater than a degree of damping in a region of the adjusting travel of the displacer element between its end positions. In this way, a fitting which can be operated by way of the failsafe drive and/or a machine part which can be operated by way of the failsafe drive are/is protected against shocks and/or jolts when the end position of the actuating drive is reached. Damage to the fitting and/or the machine part can thus be prevented.

The failsafe drive can have a locking apparatus. With the aid of the locking apparatus, a cup spring, for example the abovementioned at least one cup spring, of the drive energy store can be held in a tensioned state. With the aid of the locking apparatus, furthermore, it can be possible for the counter-element or the cam disc of the failsafe drive to be fixed, in particular to me rotationally fixed, relative to a driving shaft, for example the abovementioned driving shaft. Furthermore, it is possible for the counter-element and the cam disc of the failsafe drive to be fixed relative to one another, in particular to be rotationally fixed, with the aid of the locking apparatus.

The locking apparatus can have a toggle lever mechanism. It is triggered when the failsafe drive is actuated.

The locking apparatus can comprise, for example, a locking means which can be held in a starting position close to a locking position by way of a restoring means, in particular by way of a restoring spring. Furthermore, it is possible that the locking apparatus comprises a clamping magnet, by way of which the locking means can be moved into and/or held in its locking position, in particular counter to a restoring force of the restoring means.

The locking means can be held in its starting position close to the locking position by way of the restoring means. The remaining adjusting movement, in order to bridge the remaining travel of the locking means in its locking position, is then brought about with the aid of the abovementioned clamping magnet. The clamping magnet can have a comparatively small power consumption, which facilitates its energy-efficient use.

In order for it to be possible for the functionality of the failsafe drive to be tested from time to time, the failsafe drive can have a test stop. The test stop can be moved out of a non-use position into a use position which is situated between a tensioned position and a relieved position of a or the at least one cup spring. In this way, it is possible for the failsafe drive to be triggered as a test, without the entire drive energy store being discharged. Moreover, it can be avoided that the actuating drive has to assume its position which is undesired during normal operation, for example a closed position, while the functionality of the failsafe drive is being tested. It can thus be avoided, despite the testing of the failsafe drive, that the system which is equipped with the actuating drive which is equipped with the failsafe drive is shut down for test purposes. With the aid of the test stop, complete closure of the fitting which is equipped with the actuating drive and/or the valve which is equipped with the actuating drive can therefore be avoided when the function of the failsafe drive is to be tested.

In addition, complete charging, in particular tensioning, of the drive energy store after the abovementioned test run is carried out can be avoided.

The abovementioned test stop can preferably be capable of being moved electromechanically between its non-use position and its abovementioned use position.

It is provided in the case of another embodiment that the failsafe drive has a test stop which can be moved out of a non-use position into a use position which is arranged between two end positions of the counter-element. Here, the test stop can provide a rotary limitation of the counter-element. As a result of this rotary limitation, complete discharging of the drive energy store can likewise be avoided when the failsafe drive is to be triggered only for test purposes. In the case of this embodiment, the test stop can also be moved electromechanically between its non-use position and its use position.

It is provided in the case of another embodiment that the failsafe drive has a test stop which can be moved out of the non-use position into a use position which is arranged between two end positions of the cam disc. The test stop can provide a rotary limitation of the cam disc when the cam disc is set in rotation, for example, by way of an axial displacement of the counter-element. As a result of this rotary limitation, complete discharging of the drive energy store can likewise be avoided when the failsafe drive is to be triggered only for test purposes. In the case of this embodiment, the test stop can also be moved electromechanically between its non-use position and its use position.

It is provided in the case of one embodiment of the failsafe drive that the test stop is equipped with at least one switch, in particular with at least one microswitch. With the aid of the at least one switch, the function and/or also the position of the test stop can be monitored. Each end position of the test stop is preferably assigned in each case one switch, in particular one microswitch. It can thus be determined, in which position the test stop is in each case situated.

It is provided in the case of one embodiment that the cam disc of the failsafe drive is mounted longitudinally displaceably on a support shaft. To this end, the cam disc and the support shaft can have guide means of corresponding configuration with respect to one another. Furthermore, it is possible that the cam disc is connected fixedly to the support shaft for conjoint rotation. The support shaft can be coupled to the abovementioned driving shaft, for example, directly or via a gear mechanism.

It is provided in the case of one embodiment that the counter-element of the failsafe drive is mounted longitudinally displaceably on a support shaft. To this end, the counter-element and the support shaft can have guide means of corresponding configuration with respect to one another. Furthermore, it is possible that the counter-element is connected fixedly to the support shaft for conjoint rotation. The carrier shaft can be coupled to the abovementioned driving shaft, for example, directly or via a gear mechanism.

In order to achieve the object, a failsafe drive is also proposed, in the case of which at least one of its end positions is assigned a limit position switch, in particular a microswitch. According to the invention, the limit position switch is mounted movably, particularly preferably in a sprung manner. The limit position switch can be assigned to a, in particular the abovementioned, counter-element of the abovementioned failsafe drive, or else to a, for example the abovementioned, cam disc of the abovementioned failsafe drive. In this way, the limit position switch of the failsafe drive can also be protected against damage which might be produced as a result of its actuation.

Furthermore, in order to achieve the object, an actuating drive is proposed, in the case of which at least one end position of the actuating drive is assigned a limit position switch, in particular a microswitch. Reaching of the end position can thus be detected. Here, the at least one limit position switch is mounted movably, particularly preferably in a sprung manner. In this way, the limit position switch can be protected against damage which might be produced as a result of its actuation. Here, the limit position switch can be assigned to a, for example the abovementioned, counter-element or a cam disc of a, for example the abovementioned, failsafe drive.

As a result of the sprung mounting of the limit position switch in a holder of the limit position switch, the limit position switch can yield if the counter-element or else the cam disc moves over the actual end position as far as in internal end stop due to running on; this can happen without the limit position switch being destroyed as a result of this running on.

Finally, in order to achieve the object, an actuating drive is also proposed with an output shaft and with a drive motor which is connected at least indirectly to the output shaft for the transmission of a torque, which actuating drive has a failsafe drive according to one of the claims which are directed to a failsafe drive of this type. Here, a counter-element, in particular the abovementioned output disc, or else a, for example the abovementioned, cam disc of the failsafe drive can be connected at least indirectly to the output shaft of the actuating drive.

In order to prevent the failsafe drive driving the output shaft of the actuating drive when the drive motor is inactive and the failsafe drive is active, it can be advantageous if it is possible for the output shaft of the actuating drive to be fixed. The fixing of the output shaft of the actuating drive can take place by means of a brake and/or by means of a self-locking gear mechanism, for example by means of a self-locking worm gear mechanism.

This can therefore result in the drive energy store being rotated in the tensioned state during normal operation, while it remains non-rotationally in the failsafe operation and is relieved axially.

In order to make a manual actuation of the actuating drive possible, it can have a handwheel.

BRIEF DESCRIPTION OF THE DRAWINGS

The invention will be described in greater detail in the following text on the basis of one exemplary embodiment, but is not restricted to this exemplary embodiment. Further exemplary embodiments result from combination of the features of individual or several claims among one another and/or in a combination of individual or multiple features of the exemplary embodiment. In the drawing:

DETAILED DESCRIPTION

Figure 1:
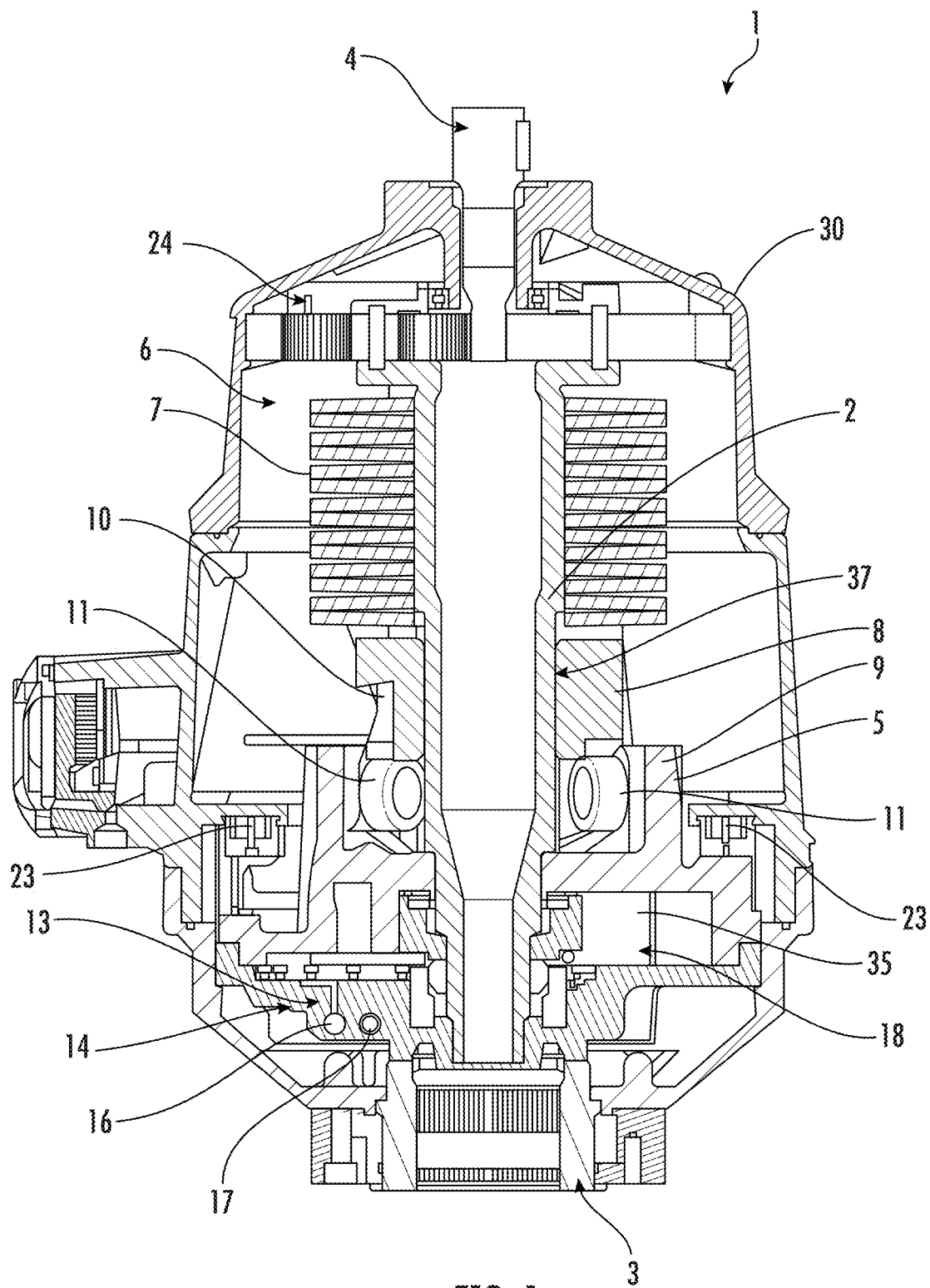
FIG. 1 shows a sectioned side view of a failsafe drive.
Figure 2:
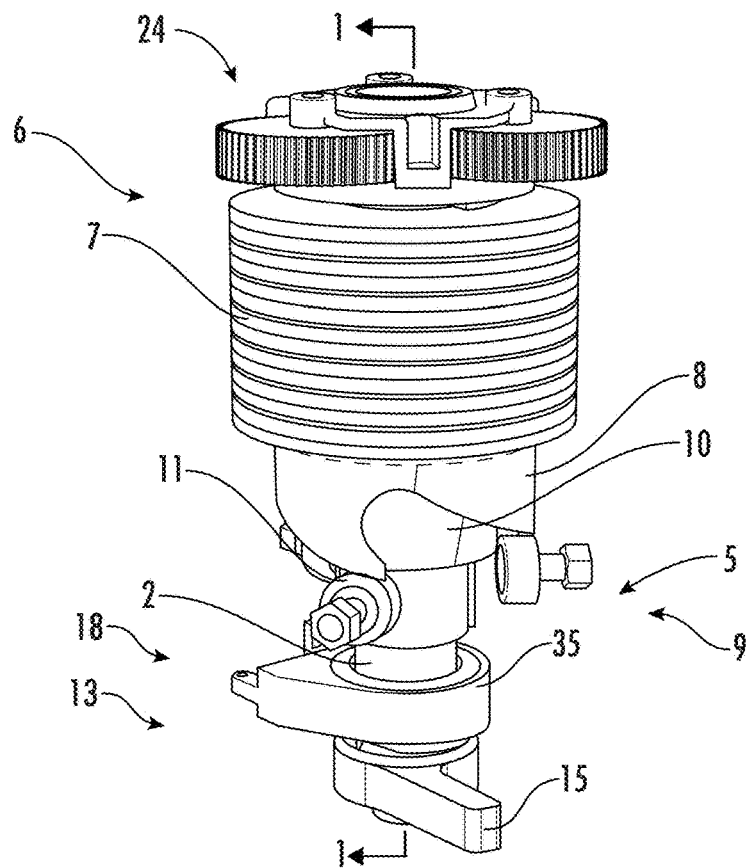
FIG. 2 shows a perspective single part illustration of the failsafe drive from FIG. 1 without a housing; a drive energy store with a plurality of stacked cup springs and a cam disc of the failsafe drive can be seen.
Figure 3:
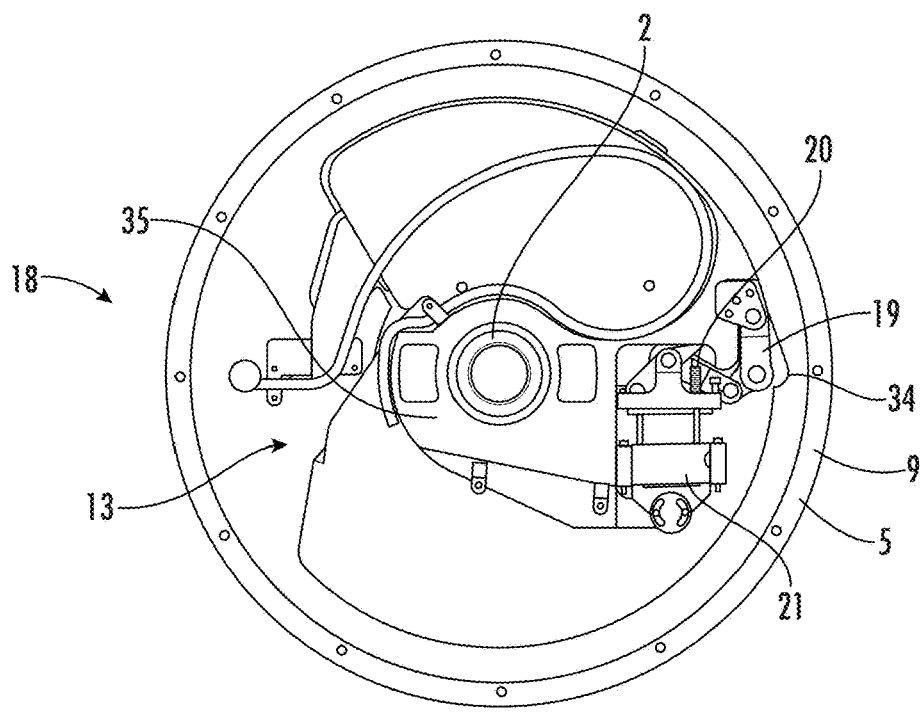
FIG. 3 shows a view looking down at a portion of the failsafe drive from FIG. 1, with certain parts removed, in order to illustrate a locking apparatus of the failsafe drive, by way of which the cup springs of the drive energy store can be held in a tensioned state.

All the figures show at least parts of a failsafe drive which is denoted overall by 1.

The failsafe drive 1 has an output shaft 3 and a driving shaft 4. A planetary gear mechanism 24 is provided between a support shaft 2 and the driving shaft 4, which planetary gear mechanism 24 converts a drive torque which acts on the driving shaft 4, and transmits it to the support shaft 2 and further to the output shaft 3.

An actuating drive (shown in FIGS. 10 and 11) is coupled to the driving shaft 4 via a coupling means (a feather key here), in order to drive the support shaft 2 and, furthermore, the output shaft 3 during normal operation. The failsafe drive 1 serves to actuate the output shaft 3 in the case of a power failure, and to move an armature or a valve which is connected to the output shaft 3 into a defined position, preferably into a closed position.

Figure 11:
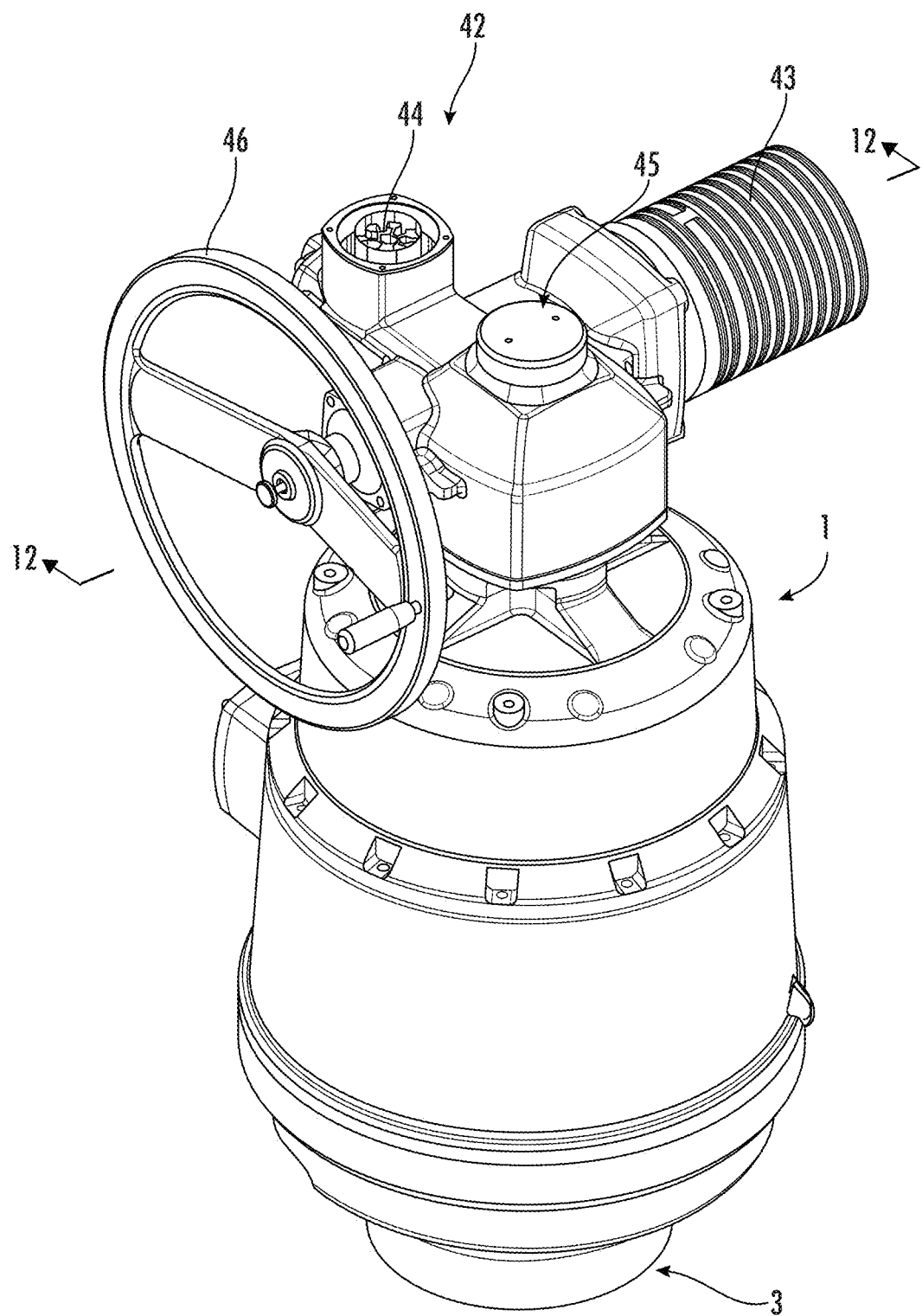
FIG. 11 shows a perspective view of an actuating drive which is connected to the failsafe drive which is shown in the previous figures.
Figure 12:
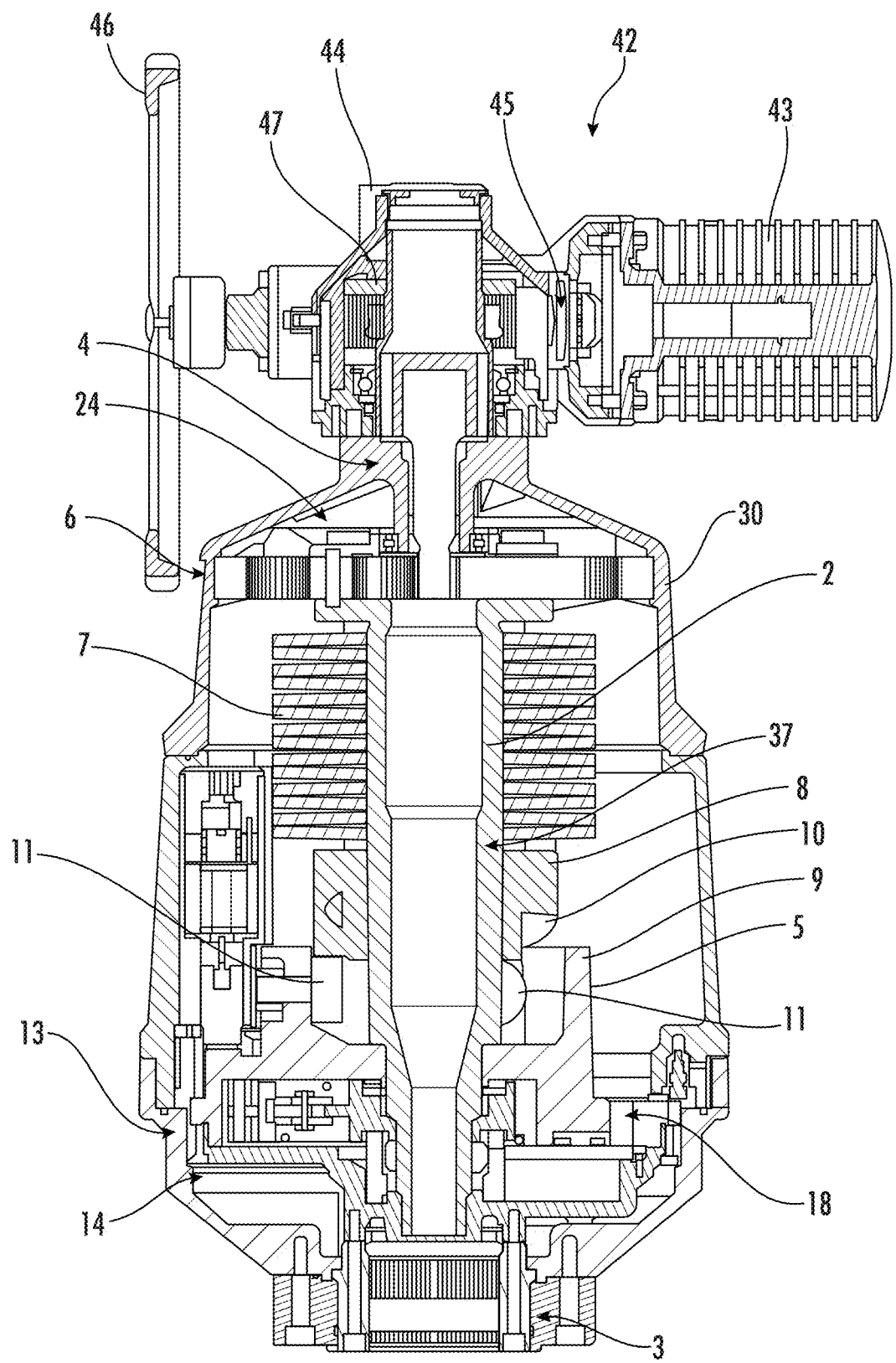
FIG. 12 shows a sectional view of the combination which is shown in FIG. 11 of the actuating drive and the failsafe drive.

In the example, the failsafe drive 1 therefore forms a failsafe unit which can be retrofitted as a module to an actuating drive 42. The actuating drive 42 is shown in FIGS. 11 and 12 and is connected to the driving shaft 4 of the failsafe drive 1. In the case of further exemplary embodiments, the failsafe drive and the actuating drive are of integrated configuration with one another.

The failsafe drive 1 has a counter-element 5 (in the form of an output disc 9 here) which is connected at least indirectly to the output shaft 3 of the failsafe drive 1.

The sectional illustration from FIG. 1 illustrates that the failsafe drive 1 has a drive energy store 6 which comprises fourteen restoring elements in the form of cup springs 7. Each of the cup springs 7 has a non-linear spring characteristic curve.

Furthermore, the failsafe drive 1 has a cam disc 8 which interacts with the abovementioned counter-element 5, namely the output disc 9. The cam disc 8 is arranged axially displaceably on the support shaft 2. The cam disc 8 and the counter-element 5 are configured for the common conversion of an axial movement of the cup springs 7 into a rotational movement of the output shaft 3 of the failsafe drive 1. In the exemplary embodiment which is shown, the axial movement of the cup springs 7 is an axial relieving movement of the cup springs 7.

The cam disc 8 can be displaced axially along the support shaft 2 by way of the axial relieving movement of the cup springs 7 of the drive energy store 6, in order to actuate the output shaft 9 which is connected at least indirectly to the output shaft 3, and in order thus to move the output shaft 3 into the position which is provided for emergencies, even if the coupled actuating drive no longer functions, for example on account of a power failure. In the case of another embodiment of the failsafe drive 1, the kinematic reversal of the above-described functional principle which will be described in greater detail in the following text is realised. Here, the counter-element 5 is then loaded axially by way of the cup springs 7, and is displaced axially and sets the cam disc 8 in rotation, in order to move the output shaft 3 of the failsafe drive 1 into the position which is provided for the emergency.

The cam disc 8 has three control cams 10 which are arranged distributed uniformly about its rotational axis. The control cams 10 in each case have a course which is adapted to the non-linear spring characteristic curve is of the cup springs 7 in such a way that, in the case of activation of the failsafe drive 1, a constant output torque is produced.

As has already been mentioned above, the cam disc 8 is guided longitudinally displaceably on the support shaft 2. To this end, the support shaft 2 has corresponding guide structures on its outer side in the form of grooves and strips. Corresponding counter-grooves and counter-strips are provided on the cam disc 8 of the failsafe drive 1. The cam disc 8 is thus guided longitudinally displaceably on the support shaft 2, but is connected fixedly to the latter for conjoint rotation.

Together with the output disc 9, the axially displaceable cam disc 8 forms a type of cam mechanism, by way of which the axial movement, brought about by way of the cup springs 7 of the drive energy store 6, of the cam disc 8 can be transmitted via the control cams 10 and output rollers 11, which interact in each case with the control cams 10, to the output disc 9 and can be converted into a rotational movement of the output disc 9.

The output disc 9 has a total of three output rollers 11 which are arranged distributed uniformly at an angular spacing of 120° about the rotational axis of the output disc 9. Therefore, the output disc 9 has a number of drive rollers 11 which corresponds to a number of control cams 10 of the cam disc 8.

The output rollers 11 are arranged in a rotatably mounted manner on the output disc 9, and serve to convert the axial movement of the cam disc 8 into a rotational movement of the output disc 9. In the case of an axial displacement of the cam disc 8, the output rollers 11 roll along the control cams and bring about a rotational movement of the output disc 9 relative to the cam disc 8 which is connected fixedly to the support shaft 2 for conjoint rotation. The relative rotation between the cam disc 8 and the output disc 9 is possible as a result of canceling of the locking action between the support shaft 2 and the output disc 9. The locking action will be described further below.

Furthermore, the failsafe drive 1 has a position indicator 12 for its output disc 9. The position indicator 12 can be seen in the perspective illustration of FIG. 4. With the aid of a curved rack 25 which is connected fixedly to the output disc 9, the movement of the output disc 9 is transmitted to a second rack 27 via a transmission shaft 26 which has two pinions. The second rack 27 is connected to an indicator element 28. The indicator element 28 can be moved into a viewing window 29 of the housing 30 by way of the movement of the output disc 9, as a result of which the position of the output disc 9 can be read off from the outside.

Figure 5:
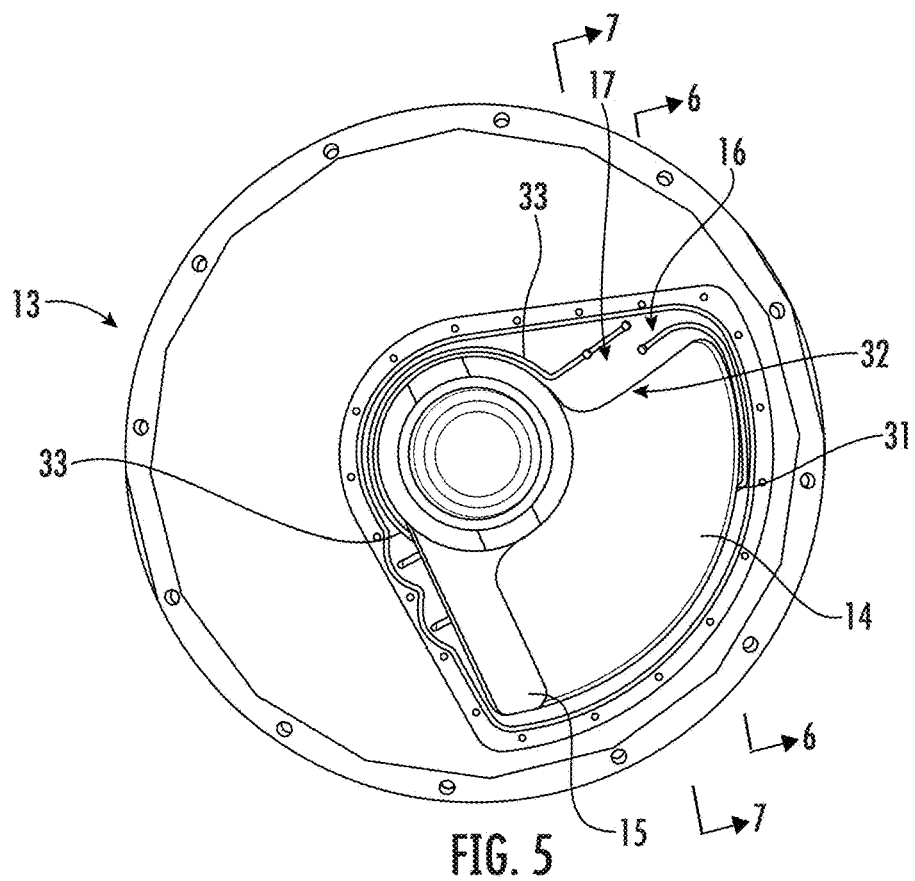
FIG. 5 shows a view looking down at a portion of the failsafe drive from FIG. 1, with certain parts removed, in order to illustrate a movement damper of the failsafe drive, the view showing a liquid chamber and the displacer element of the movement damper.

The counter-element 5 of the failsafe drive 1 (that is to say, the output disc 9 here) is coupled at least indirectly to a movement damper 13. In the movement damper 13 is shown in FIG. 5, for example.

The movement damper 13 comprises a liquid chamber 14 which is filled with liquid, for example with oil, and at least one displacer element 15 which can be moved therein. The displacer element 15 is coupled to the support shaft 2 and, as a result, is connected at least indirectly to the counter-element 5, that is to say the output disc 9.

A degree of damping of the movement damper 13 can be set. The setting of the degree of damping can take place with the aid of its total of two flow regulators 16 and 17 which can be seen in the partially sectioned illustrations of FIGS. 6 and 7.

With the aid of the two flow regulators 16 and 17, furthermore, the movement damper 13 is configured to provide different degrees of damping along an adjusting travel of the displacer element 15 through the liquid chamber 14. It is provided here that the degree of damping which is provided by the movement damper 13 is greater in the region of an end position of the displacer element 15 on its adjusting travel through the liquid chamber 14 than a degree of damping in a region of the adjusting travel of the displacer element 15 between the end positions.

Figure 6:
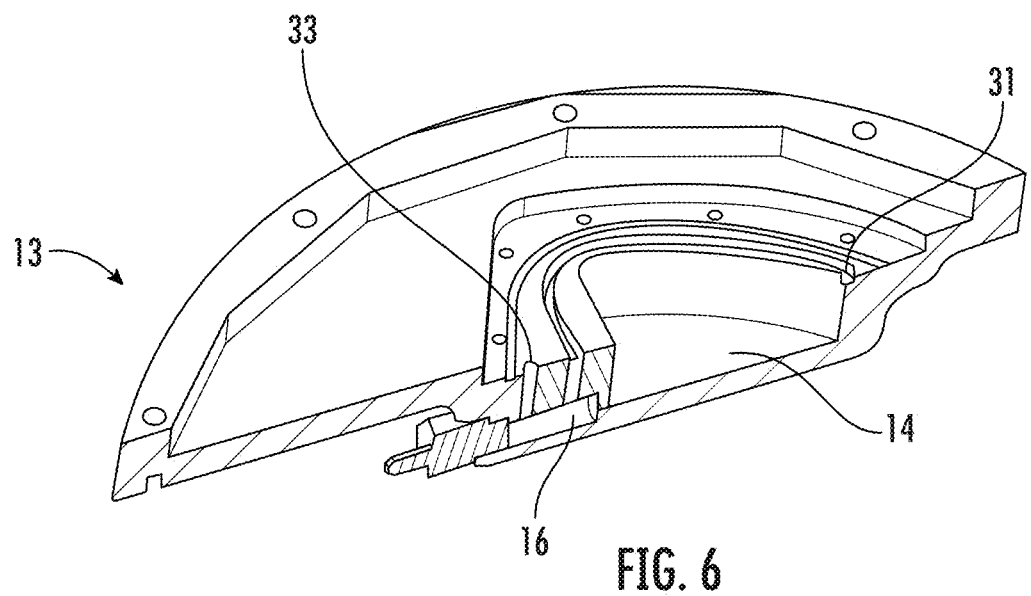
FIG. 6 shows a partially sectioned, perspective view of the liquid chamber which is shown in FIG. 5 in order to illustrate a first flow regulator of the movement damper, by means of which a movement of the displacer element on its main path can be damped.
Figure 7:
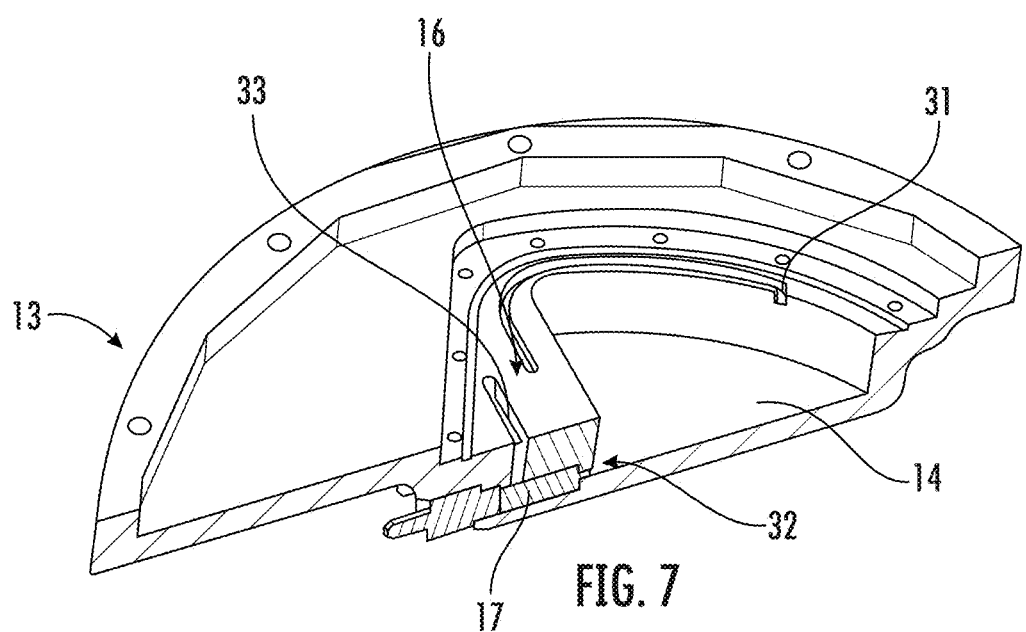
FIG. 7 shows a partially sectioned, perspective view of the liquid chamber which is shown in FIGS. 5 and 6 in order to illustrate a second flow regulator of the movement damper, by means of which a movement of the displacer element on the last part of its travel into an end position can be damped.

FIGS. 6 and 7 illustrate that two outlet openings 31 and 32 are provided within the liquid chamber 14, through which outlet openings 31 and 32 liquid which is displaced with the aid of the displacer element 15 can be fed to the two flow regulators 16 and 17.

On its main path, the displacer element 15 displaces the liquid in such a way that it can exit from the liquid chamber 14 through the two outlet openings 31 and 32 and can be fed to the two flow regulators 16 and 17. As soon as the displacer element 15 passes the outlet opening 31 for the main path, the liquid which is displaced by way of the spacer element 15 can still flow out of the liquid chamber 14 only via the outlet opening 32 for the end position and can be fed to the flow regulator 17 for the end position. This leads to a degree of damping which is increased in comparison, with the result that the failsafe drive 1, the actuating drive 42 and the machine part or fitting which is to be actuated by way of the actuating drive 42 are projected reliably against jolt-like loads when the output shaft 3 is moved into its end position.

The outlet openings 31 and 32 are connected via corresponding channels to the flow regulators 16 and 17. Via a return channel 33, the oil which is displaced out of the liquid chamber 14 on one side through the outlet openings 31 and 32 is fed to the liquid chamber 14 again.

Figure 4:
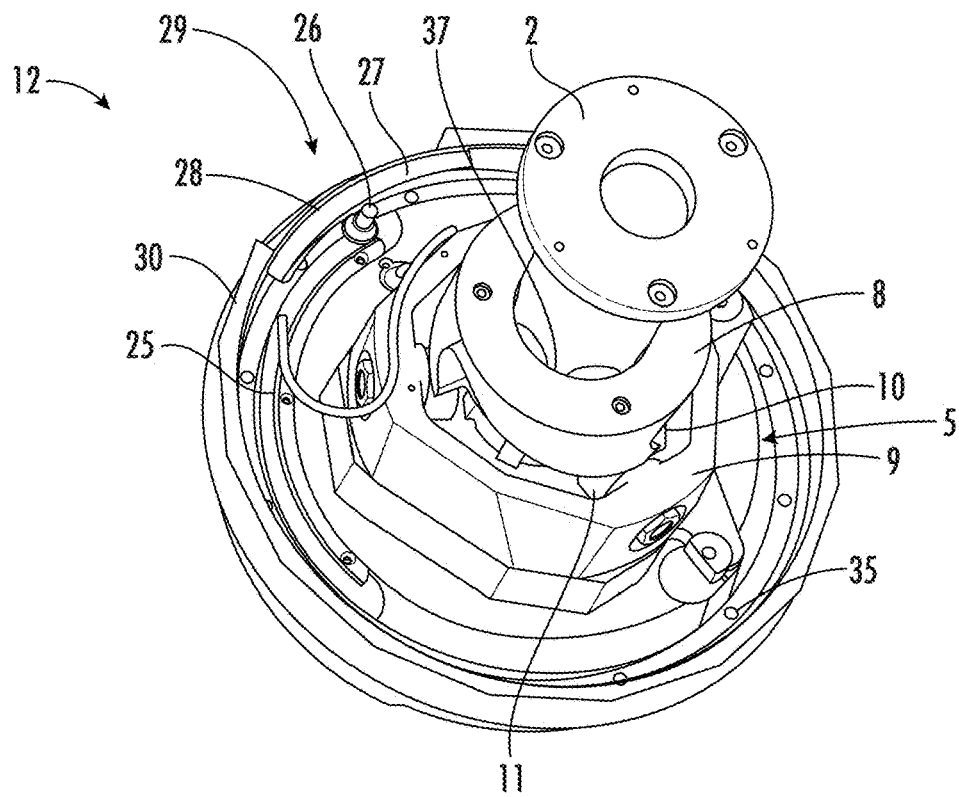
FIG. 4 shows a perspective assembly illustration of the failsafe drive which is shown in FIG. 1 with a position indicator which is configured to indicate a position of its output disc.

FIG. 4 illustrates a locking apparatus 18 of the failsafe drive 1. With the aid of the locking apparatus 18, the cup springs 7 of the drive energy store 6 can be held in a tensioned state. This takes place by virtue of the fact that the locking apparatus 18 fixes, in particular rotationally fixes, the output disc 9 relative to the support shaft 2 and relative to the cam disc 8, as has already been indicated above.

For this purpose, the locking apparatus 18 has a locking means 19 which is held close to a locking position by way of a restoring means 20, by way of a restoring spring here. In this position, the locking means 19 does not yet connect the output disc 9 to the support shaft 2. Furthermore, the locking apparatus 18 also comprises a clamping magnet 21, by means of which the locking means 19 can be moved into its locking position and can be held counter to the restoring force of the restoring means 20.

The locking means 19 is a latching lever which is connected via a toggle lever to the restoring means 20 and, in its locking position, engages into a corresponding latching recess 34 on the drive disc 9 and thus connects the output shaft 9 to the support shaft 2 fixedly for conjoint rotation. The latching apparatus has a latching carrier 35 which is connected fixedly to the support shaft 2 for conjoint rotation.

In the case of a power failure or in the case of emergency triggering, that is to say when the clamping magnet 21 is no longer activated or is currentless, the locking means 19 is no longer held in its locking position. The locking means 19 is moved on the output disc 9 by way of the torque which acts on the output disc. The fixed connection for conjoint rotation which the locking apparatus 18 provides between the output disc 9 and the support shaft 2 is canceled.

As a result of the cancellation of the fixed connection for conjoint rotation, the output shaft 9 can be rotated relative to the cam disc 8. The drive energy store 6 with its stacked cup springs 7 thus becomes active and displaces the cam disc 8 axially on the support shaft 2 and in the process brings about a rotation of the output disc 9, by way of which rotation the output shaft 3 and ultimately a machine part and/or a fitting which is connected to this output shaft 3 can be moved into the setpoint position which is provided for the case of an emergency. In the case of renewed activation of the clamping magnet 21, the restoring means 20 assists it being possible for the locking means 19 to be moved into its locking position again.

The failsafe drive 1 has a test stop 22. The test stop 22 can be seen in FIG. 10 and can be moved out of the non-use position into a use position. The use position, into which the test stop 22 can be moved, lies between two end positions of the output disc 9, one end position of the output disc 9 being assigned to a tensioned position, and a second end position being assigned to a relieved position of the plurality of cup springs 7 of the drive energy store 6 of the failsafe drive 4. A latch bolt which moves out of its starting position which is shown in FIG. 10 into its use position serves as test stop 22.

If the test stop 22 is moved electromechanically into its use position, the function of the failsafe drive 1 can be checked, without the output shaft 3 being moved completely into its position which is provided for the case of an emergency. It thus becomes possible that the drive energy which is stored in the drive energy store 6 does not have to be discharged completely when the failsafe drive 1 is to be triggered for test purposes.

Figure 10:
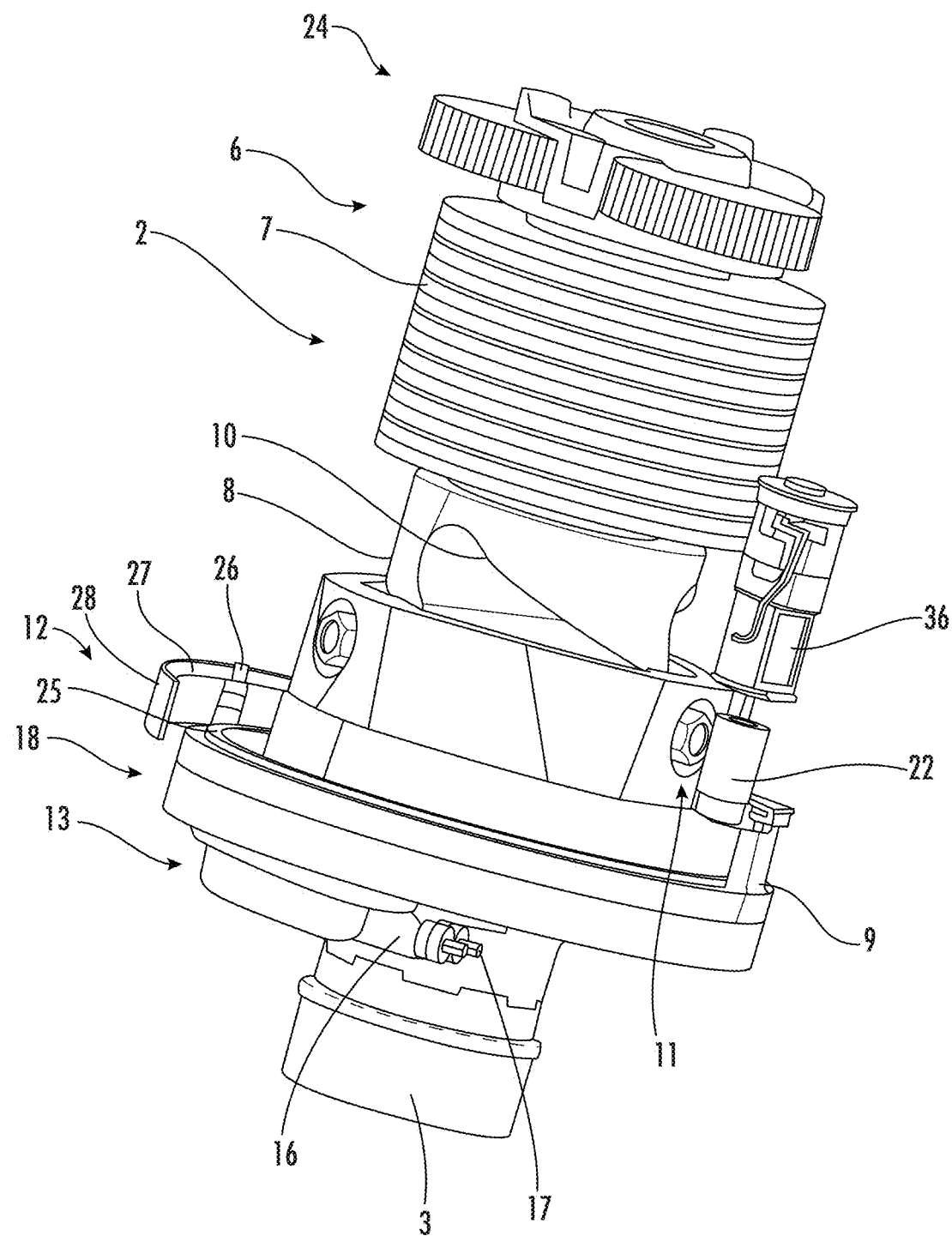
FIG. 10 shows a perspective illustration of parts of the failsafe drive in order to illustrate the cam disc with its three control cams which are assigned in each case one of three output rollers of the output disc of the failsafe drive.

An electromechanical actuator 36 which can likewise be seen in FIG. 10 is provided for the actuation of the test stop 22. The actuator 36 moves the test stop 22 into its use position, where it limits a rotary angular range, within which the output disc 9 can be rotated.

Figure 8:
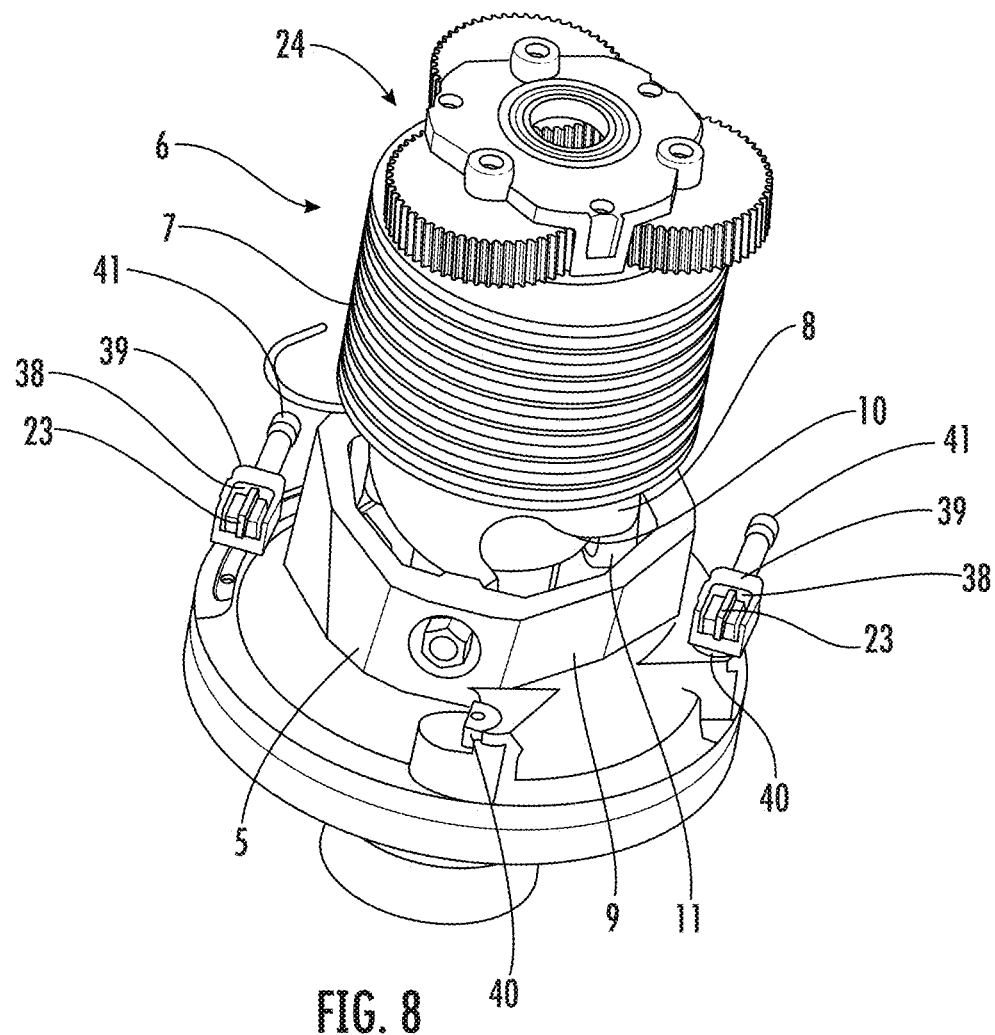
FIG. 8 shows a perspective view of the failsafe drive in order to illustrate to limit position switches of the failsafe drive which are mounted in a sprung manner.
Figure 9:
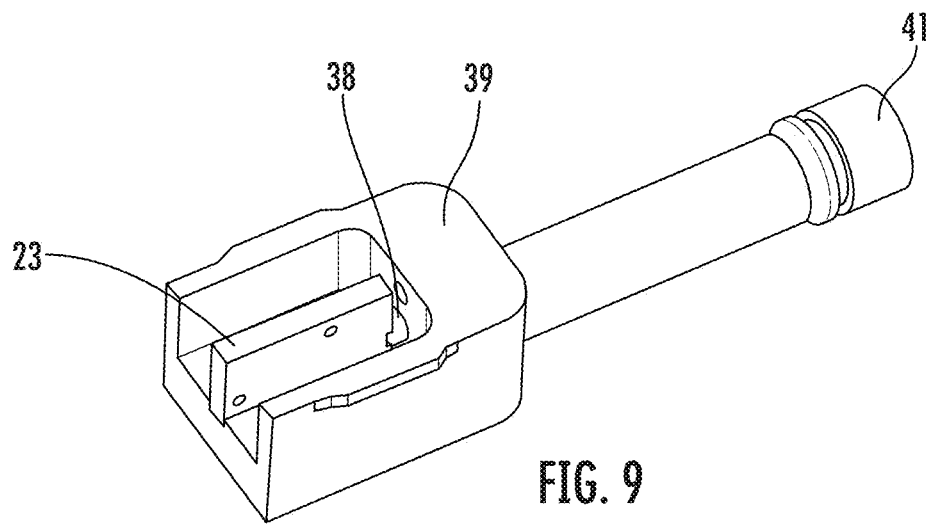
FIG. 9 shows a single part illustration of one of the two limit position switches which are shown in FIG. 8.

The failsafe drive 1 has a total of two limit position switches 23 in the form of in each case one microswitch. The limit position switches 23 are shown in FIGS. 8 and 9, for example. The limit position switches 23 are mounted in a holder 39 in a sprung manner by means of a suspension means 38, and are arranged in the housing 30 of the failsafe drive 1. The limit position switches 23 are assigned to the counter-element 5 of the failsafe drive 1. When the counter-element 5 reaches its end position, it makes contact with one of the limit position switches 23 by way of one of its two stops 40. The stops 40 are mounted rotatably on the counter-element 5, in order to make flat contact of the stops 40 against the limit position switches 23 which are assigned to them possible. As a result of the sprung mounting of the limit position switches 23, the limit position switches 23 are protected against damage when the counter-element 5 (here, the output disc 9) of the failsafe drive 4 loads the limit position switches 23. Each limit position switch 23 is assigned a setting screw 41. With the aid of the setting screws 41, the positions of the holders 39 and therefore also the positions of the limit position switches 23 can be changed.

FIGS. 11 and 12 show the combination of the actuating drive 42 with the failsafe drive 1. The actuating drive 42 has a drive motor 43. The drive motor 43 is connected to an output shaft 45 of the actuating drive 42. The output shaft 45 is connected to the driving shaft 4 of the failsafe drive 1 for the transmission of torque by means of a worm gear mechanism 47. In this way, the output disc 9 of the failsafe drive 1 is also connected at least indirectly to the output shaft 45 of the actuating drive 42.

It is possible for the output shaft 45 to be fixed. In the exemplary embodiment which is shown, the fixing of the output shaft 45 takes place via the abovementioned worm gear mechanism 47 which is a self-locking gear mechanism. It is prevented in this way that the drive motor 43 of the actuating drive 42 is rotated by way of the activated failsafe drive 1. The fixing of the drive motor 43 ultimately leads to the support shaft 2 of the failsafe drive 1 being held fixedly by way of the carrier shaft 2 of the drive motor 43 for conjoint rotation when the drive motor 43 is currentless.

The actuating drive 42 has an electrical connector 44. The actuating drive 42 can also be actuated manually via a handwheel 46 as required.

The invention is concerned with improvements in the technical field of actuating drives. To this end, inter alia, a failsafe drive 4 for an actuating drive 1 is proposed, which failsafe drive 4 has a drive energy store 6 which comprises at least one cup spring 7 and/or one cam disc 8 for the conversion of an axial drive movement of a restoring element into a rotational drive movement.

LIST OF REFERENCE NUMERALS

1 Failsafe drive
2 Support shaft

3 Output shaft
4 Driving shaft
5 Counter-element
6 Drive energy store
7 Cup spring
8 Cam disc
9 Drive disc
10 Control cam
11 Output roller
12 Position indicator
13 Movement damper
14 Liquid chamber
15 Displacer element
16 Flow regulator for the main path
17 Flow regulator for the end position
18 Locking apparatus
19 Locking means
20 Restoring means
21 Clamping magnet
22 Test stop
23 Limit position switch
24 Planetary gear mechanism
25 First rack on 9
26 Transmission shaft
27 Second rack
28 Indicator element
29 Viewing window
30 Housing of 1
31 Outlet opening for the main path
32 Outlet opening for the end position
33 Return channel
34 Latching recess
35 Latching carrier
36 Electromechanical actuator
37 Guide means on 2
38 Suspension means for 23
39 Holder for 23
40 Stop on 5/9
41 Setting screw for 23
42 Actuating drive
43 Drive motor
44 Electrical connection of 42
45 Output shaft of 42
46 Handwheel
47 Worm gear mechanism

The invention claimed is:

1. A failsafe drive (1) for an actuating drive, the failsafe drive (1) comprising:
   a cam disc (8),
   a restoring element,
   a counter-element (5), and
   an output shaft (3),
   the cam disc (8) and the counter-element (5) being configured for joint conversion of an axial movement of the restoring element along the output shaft (3) into a rotational movement of the output shaft (3),
   the cam disc (8) has at least one control cam (10), a profile of which is adapted to a spring characteristic curve of the restoring element such that, upon each activation of the failsafe drive (1), at least one of a constant output movement or a constant output torque is adapted to be generated.

2. The failsafe drive (1) according to claim 1, wherein the restoring element comprises at least one of a restoring spring or a drive energy store (6) which includes at least one cup spring (7).

3. The failsafe drive (1) according claim 1, wherein the counter-element (5) is rotatable by an axial movement, caused by the restoring element, of the cam disc (8), and the output shaft (3) is rotatable by the rotational movement of the counter-element (5), or the cam disc (8) is rotatable by the axial movement, caused by the restoring element, of the counter-element (5), and the output shaft (3) is rotatable by the rotational movement of the cam disc (8).

4. The failsafe drive (1) according to claim 1, wherein at least one of a) the counter-element (5) or the cam disc (8) comprise an output disc (9), or b) the counter element (5) or the cam disc (8) is connectable at least indirectly to a driving shaft (4).

5. The failsafe drive (1) according to claim 1, wherein for the cam disc (8) having the at least one control cam (10), the profile is adapted to a non-linear spring characteristic curve of the at least one restoring element, such that, upon activation of the failsafe drive (1), the at least one of the constant output movement or the constant output torque is produced.

6. The failsafe drive (1) according to claim 1, wherein the cam disc (8) comprises a globoid cam disc.

7. The failsafe drive (1) according to claim 1, wherein the drive energy store (6) comprises at least two laminated cup springs (7).

8. The failsafe drive (1) according to claim 1, wherein the cam disc (8) includes at least two control cams (10) which are arranged distributed about a rotational axis of the cam disc (8).

9. The failsafe drive (1) according to claim 8, wherein the counter-element (5) includes at least one output roller (11), and at least one of a) a number of the output rollers (11) to a number of control cams (10) of the cam disc (8), the drive rollers (11) or b) the at least one output roller (11) being guided, in the use position, along an assigned one of the control cams (10) of the cam disc (8).

10. The failsafe drive (1) according to claim 1, further comprising a position indicator (12) for indicating a position of the output shaft (3).

11. The failsafe drive (1) according to claim 1, wherein the output shaft (3) is coupled at least indirectly to a movement damper (13).

12. The failsafe drive (1) according to claim 11, wherein the movement damper (13) comprises a liquid chamber (14) which is filled with oil, and at least one displacer element (15) which is movable therein, the displacer element (15) being connected or connectable at least indirectly to the output shaft (3).

13. The failsafe drive (1) according to claim 12, wherein a degree of damping of the movement damper (13) is settable.

14. The failsafe drive (1) according to claim 13, wherein the movement damper (13) is configured to provide different degrees of damping along an adjustment travel of the at least one displacer element (15), the degree of damping in a region of an end position of the displacer element (15) on an adjusting travel thereof through the liquid chamber (14) being greater than a degree of damping in a region of the adjusting travel of the displacer element (15) between the end positions.

15. The failsafe drive (1) according to claim 1, further comprising a locking apparatus (18) by which at least one of a) at least one cup spring (7) of the restoring element is holdable in a tensioned state, b) the counter-element (5) or the cam disc (8) is fixable relative to a driving shaft (4), or c) the counter element (5) and the cam disc (8) are fixable relative to one another.

16. The failsafe drive (1) according to claim 15, wherein at least one of a) the locking apparatus (18) comprises a locking means (19) which is arranged by a restoring means (20) in a starting position close to a locking position, or b) the locking apparatus (18) comprises a clamping magnet (21), by which the locking means (19) is at least one of moved into or held in a locking position.

17. The failsafe drive (1) according to claim 1, further comprising a test stop (22) which is movable out of a non-use position into a use position and is arranged at least one of a) between a tensioned position and a relieved position of at least one cup spring (7) of the restoring element or b) between two end positions of the counter-element (5) or the cam disc (8), the test stop (22) providing a rotary limitation of at least one of the counter-element (5) or the cam disc (8).

18. The failsafe drive (1) according to claim 17, wherein at least one of a) the cam disc (8) or the counter-element (5) of the failsafe drive (1) is mounted longitudinally displaceably on a support shaft (2), the cam disc (8) or the counter-element (5) and the support shaft (2) having corresponding guide means (37) or b) the cam disc (8) or the counter-element (5) of the failsafe drive (1) are connected fixedly to the support shaft (2) for conjoint rotation.

19. The failsafe drive (1) according to claim 17, wherein at least one said end position of the failsafe drive (1) is assigned a limit position switch (23) which is mounted movably, and the limit position switch (23) is assigned to the counter-element (5) or the cam disc (8) of the failsafe drive (1).

20. An actuating drive (42), at least one end position of the actuating drive being assigned a limit position switch (23) which is mounted movably, the actuating drive (1) comprising the failsafe drive (1) according to claim 1, and the limit position switch (23) is assigned to the counter-element (5) of the failsafe drive (1).

21. The actuating drive (42) according to claim 20, further comprising an output shaft (45) and a drive motor (43) which is connected at least indirectly to the output shaft (45) for the transmission of a torque.

22. The actuating drive (42) according to claim 21, wherein the output shaft (45) of the actuating drive (42) is fixable by a brake or a self-locking gear mechanism.

* * * * *